(12) United States Patent
Maddali et al.

(10) Patent No.: US 8,004,222 B2
(45) Date of Patent: Aug. 23, 2011

(54) NEGATIVE SEQUENCE CARRIER SIGNAL CONTROLLER

(75) Inventors: Vijay K. Maddali, Rockford, IL (US); William J. Peterson, Rockton, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 379 days.

(21) Appl. No.: 12/236,330

(22) Filed: Sep. 23, 2008

(65) Prior Publication Data

US 2010/0072930 A1    Mar. 25, 2010

(51) Int. Cl.
    *H02P 6/18* (2006.01)
(52) U.S. Cl. ......... 318/400.34; 318/400.01; 318/400.32; 318/400.42; 318/700
(58) Field of Classification Search ............. 318/400.34, 318/400.32, 400.01, 400.42, 700
See application file for complete search history.

(56) References Cited

U.S. PATENT DOCUMENTS

| | | | |
|---|---|---|---|
| 5,565,752 A | 10/1996 | Jansen et al. | |
| 6,052,297 A * | 4/2000 | Akamatsu et al. | 363/84 |
| 6,762,573 B2 * | 7/2004 | Patel | 318/400.02 |
| 6,822,418 B2 * | 11/2004 | Harke | 318/807 |
| 7,034,497 B2 * | 4/2006 | Markunas et al. | 318/400.33 |

\* cited by examiner

*Primary Examiner* — Bentsu Ro
*Assistant Examiner* — David S Luo
(74) *Attorney, Agent, or Firm* — Kinney & Lange, P.A.

(57) ABSTRACT

A negative sequence feedback circuit is connected to monitor and minimize unbalances in a high-frequency ac carrier signal provided to a motor/load for the purpose of detecting rotor position. The negative sequence feedback circuit detects unbalances in the high-frequency ac carrier signal and generates negative sequence feedback. The feedback is combined with command signals used to generate the high-frequency ac carrier signal, and the combination of the command signals with the negative sequence feedback is provided to an inverter for generation of the high-frequency ac carrier signal, wherein the negative sequence feedback reduces unbalances in the resulting high-frequency ac carrier signal such that a balanced high-frequency carrier signal is provided to the motor/load.

13 Claims, 2 Drawing Sheets ated for an actual rotor saliency, resulting in incorrect estimates of the rotor position.

NEGATIVE SEQUENCE CARRIER SIGNAL CONTROLLER

BACKGROUND

The present invention relates to a carrier injection sensorless position system for use in dynamoelectric machines.

In motor drive applications, information about the position and angular velocity of the rotor is required to optimally control the phase and frequency of power provided to drive the motor. A variety of different types of sensors have been used over the years to resolve the position and angular velocity of the rotor. However, the use of dedicated sensors adds additional size, weight and complexity to the motor.

To reduce the cost associated with dedicated position resolvers, a variety of self-sensing or sensorless systems have been developed that are capable of detecting the position of the rotor. For instance, some systems detect rotor position by monitoring the back electromotive force (BEMF) generated by the dynamoelectric machine. However, at low speeds (i.e., low angular velocities) the monitored BEMF is too small to provide accurate detection of rotor position and speed. In response to this problem, prior art methods stimulate the dynamoelectric machine by injecting a high-frequency carrier signal.

For example, a saliency tracking system works by applying a carrier signal having a frequency greater than the angular velocity of the rotor such that the injected carrier signal sweeps around the machine faster than the rotor is turning. Saliencies within the machine act to vary the impedance of the rotor as seen by the high-frequency carrier signal, and the varied impedance alters the resulting signal (e.g., rotating current waveform or potential waveform). Monitoring and demodulation of the resulting signal allows rotor position and velocity to be determined. However, unbalances in the high-frequency carrier signal injected into the dynamoelectric machine cause modifications to the resulting signal that result in incorrect estimation of the rotor position and velocity.

SUMMARY

A negative sequence feedback circuit is used to detect unbalances in a high-frequency carrier signal provided or injected into a dynamoelectric machine for the purpose of detecting the rotor position of the machine based on the response to the high-frequency carrier signal. The negative sequence feedback circuit monitors the high-frequency carrier signal and detects unbalances based on analysis of negative sequence components of the high-frequency carrier signal. In response to detected unbalances, a negative sequence feedback signal is applied to modify the high-frequency carrier signal such that unbalances in the high-frequency carrier signal are minimized.

DETAILED DESCRIPTION

The present invention employs a negative sequence carrier feedback loop to remove unbalances in the high-frequency carrier signal applied to a machine for purposes of sensorless rotor position detection. In particular, the present invention monitors the high-frequency carrier signal injected into the machine and detects unbalances based on analysis of the negative sequence component of the carrier signal. A feedback signal is generated in response to the negative sequence component of the carrier signal. The feedback signal is added to a high-frequency carrier command signal and the combination is employed to generate a balanced high-frequency carrier signal for injection to a machine.

Figure 1:
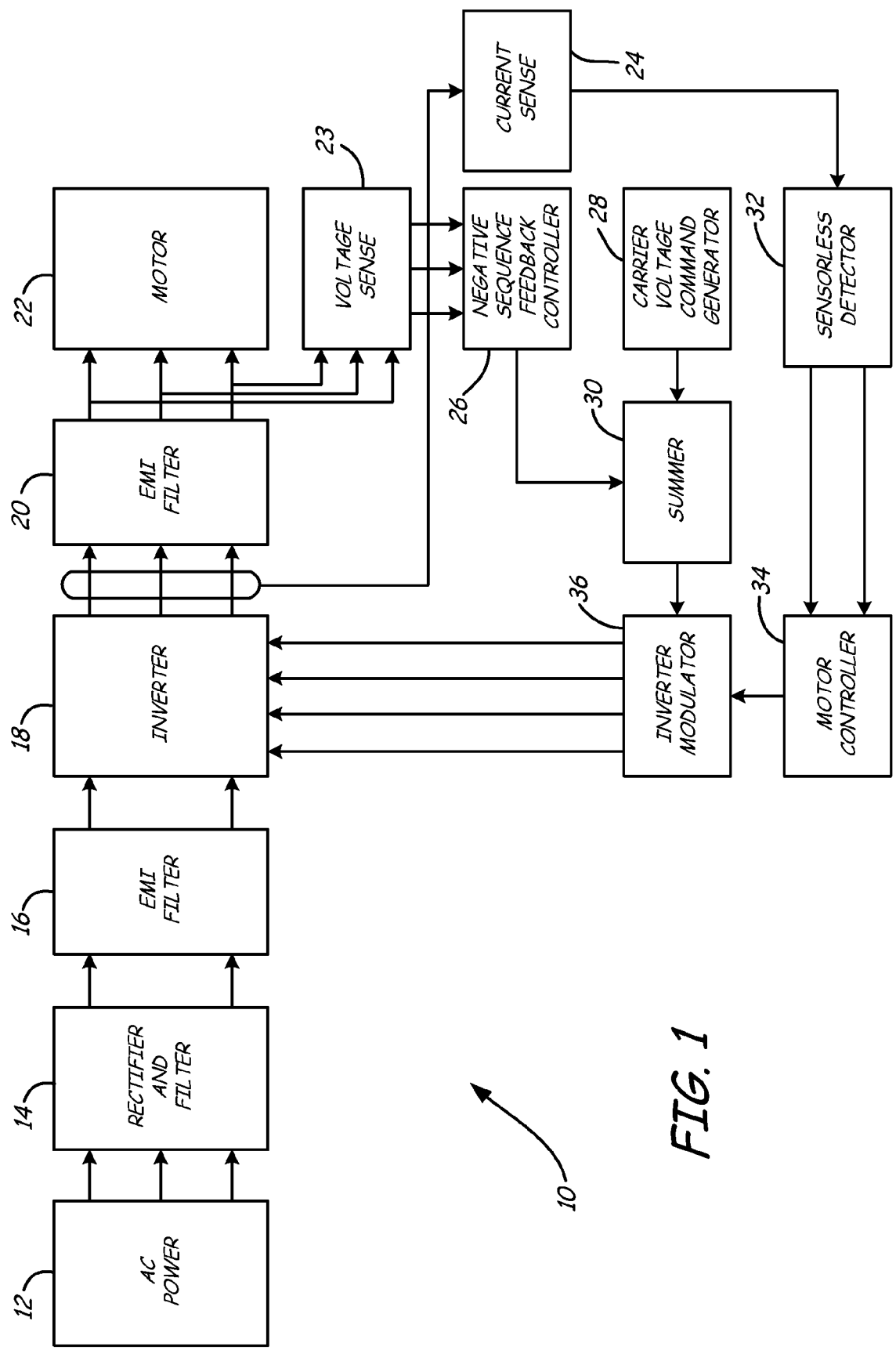
FIG. 1 is a block diagram of an exemplary embodiment of a sensorless rotor position system that employs a negative sequence carrier feedback loop to remove unbalances in the high-frequency carrier signal.

FIG. 1 is a block diagram of an exemplary embodiment of a sensorless rotor position system 10 that employs a negative sequence carrier feedback loop to remove unbalances in the high-frequency carrier signal. In the exemplary embodiment shown in FIG. 1, system 10 includes alternating current (ac) power source 12, rectifier/filter components 14, electromagnetic interference (EMI) filter 16, inverter 18, EMI filter 20, motor/load 22, voltage sense circuit 23, current sense circuit 24, negative sequence feedback controller 26, high-frequency carrier command signal generator 28, summer 30, sensorless position detector 32, motor controller 34, and inverter modulator 36. In this embodiment, the high-frequency carrier signal provided to motor/load 22 is a voltage signal, wherein ac current generated in response to the high-frequency voltage is used to estimate rotor position. In other exemplary embodiments, the injected high-frequency signal may be a controlled ac current, and the monitored voltage response would be used to detect rotor position.

In this embodiment, three-phase ac power 12 provided from a source (power grid, ac generator, etc) is converted to dc voltage by rectifier/filter 14 and smoothed by EMI filter 16. The resulting dc voltage is provided to inverter 18, which includes a plurality of transistors that are selectively controlled (i.e., turned 'on' and 'off') to convert the dc voltage to a three-phase ac voltage of a desired frequency, phase, etc. The ac voltage provided by inverter 18 is supplied though EMI filter 20 to motor 22. Selective control of the ac voltage provided by inverter 18 allows the operation of motor 22 to be selectively controlled.

In order to determine the proper phase and frequency of the ac voltage provided by inverter 18 to motor 22, the position of the rotor must be known or estimated. In the embodiment shown in FIG. 1, rotor position is estimated by injecting a high-frequency carrier voltage (which includes negative sequence feedback discussed in more detail with respect to FIG. 2) onto the motor drive signals provided by inverter 18 and monitoring the resulting three-phase ac current generated in response to the high-frequency carrier voltage. This high-frequency carrier voltage is independent of the ac motor drive signals generated by inverter 18 to allow motor shaft rotation. For example, in situations in which motor/load 22 is at rest, the frequency of the ac motor drive signals supplied to control the operation of motor/load 22 may be zero or very low. In contrast, the high-frequency carrier voltage injected while the motor is at rest may be provided at frequencies as high as 500 Hertz.

Accurate detection of rotor position depends, in part, on the quality of high-frequency voltage provided by EMI filter 20 to motor 22. In particular, unbalances in the high-frequency voltage provided to motor 22 will cause unbalances or distorted saliencies in the monitored current. If the unbalance in the high-frequency voltage is significant, then detection of rotor position by sensorless detector 32, which is based on detection of rotor saliencies, will be distorted by the "stationary saliency" caused by the unbalance in the high-frequency carrier voltage. That is, the stationary saliency will be mistaken as a rotor saliency that will negatively affect the ability of sensorless position detector 32 to estimate the position of the rotor.

The estimated rotor position and/or speed estimates are provided to motor controller 34. Based on the rotor position and/or speed estimates, as well as the desired operation of motor 22, motor controller 34 calculates controls signals provided to inverter 18. Motor drive control signals generated by motor controller 34 are converted to duty cycle command signals (i.e., pulse width modulation (PWM) signals) by inverter modulator 36. In addition, a high-frequency command signal provided by high-frequency carrier generator 28, which includes negative sequence feedback provided by negative sequence feedback circuit 26, is provided to inverter modulator 36. As a result of the command signals provided by motor controller 34 and summer 30, inverter modulator 36 generates duty cycle control signals that result in inverter 18 generating ac power that includes both the ac motor drive component and the high-frequency carrier signal component.

Unbalances in the high-frequency carrier signal are typically a result of transistor dead-time within inverter 18. Transistor dead-time refers to a precautionary measure enforced on inverter 18 that prevents transistors connected to a single phase of the inverter output from conducting at the same time. This precautionary measure prevents the flow of large currents from the positive dc bus to the negative dc bus. However, transistor dead-time also causes unbalances in the high-frequency carrier signal supplied to motor 22 that negatively affect sensorless detection of rotor position. In addition to transistor dead-time, variations in EMI filter 20 may also contribute to unbalances in the high-frequency carrier signal supplied to motor 22.

Negative sequence feedback circuit 26 is employed to provide closed-loop feedback of the high-frequency carrier voltage provided by inverter 18 to motor/load 22 to correct for unbalances in the high-frequency carrier voltage applied to the motor/load 22. In particular, ac voltages (including motor drive components and high-frequency components provided to motor 22) are monitored by voltage sense circuit 23. Negative sequence feedback circuit 26 analyzes the monitored ac voltages by converting the monitored voltages from a three-phase stationary reference frame to a two-phase rotating reference frame (referred to herein as the negative sequence reference frame or negative sequence d-q reference frame). Similar to the method by which rotor saliencies are detected based on the ac current generated in response to the high frequency carrier voltage, an unbalance in the high-frequency carrier voltage is detected based on the negative sequence components associated with the monitored high-frequency carrier voltage. As discussed above, in response to detected unbalances, negative signal feedback circuit 26 generates a negative sequence feedback signal that is combined with the high-frequency command signal by summer 30. The resulting negative sequence feedback biased command signal is employed by inverter modulator 36 to generate a balanced, high-frequency carrier voltage for supply to motor 22.

Figure 2:
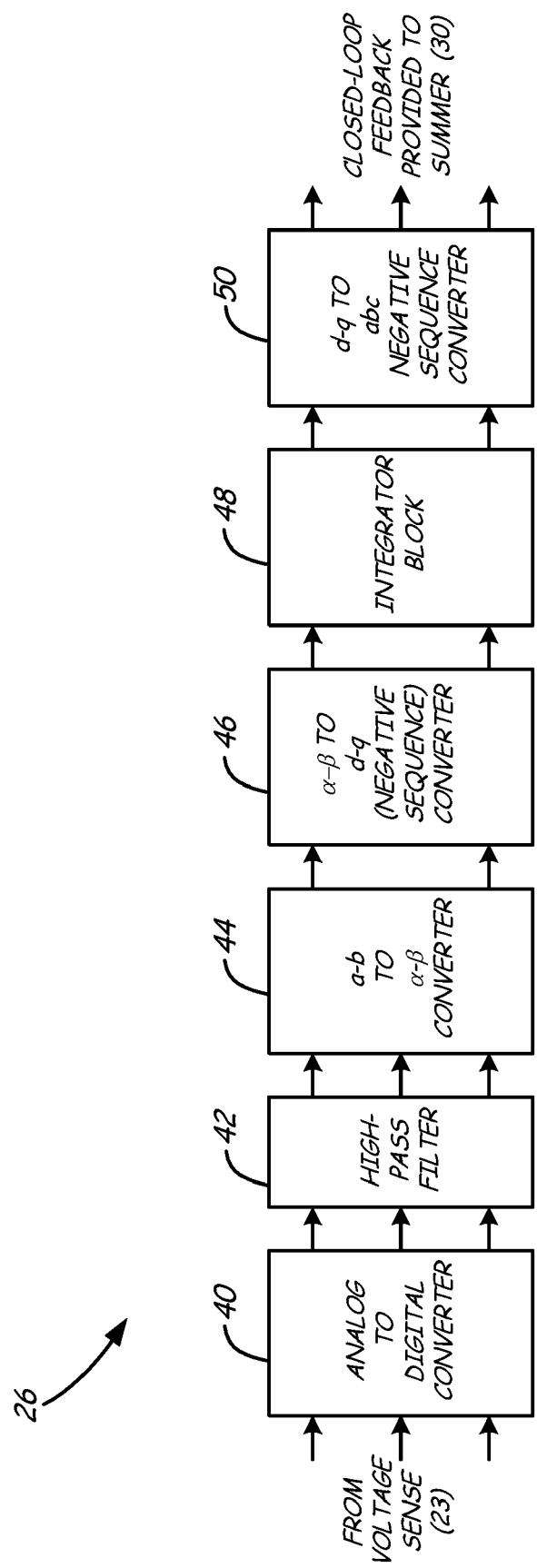
FIG. 2 is a block diagram of an exemplary embodiment of the negative sequence carrier feedback loop.

FIG. 2 is a block diagram illustrating in additional detail an exemplary embodiment of negative sequence feedback circuit 26, which includes analog-to-digital converter (ADC) 40, high-pass filter 42, a-b to α-β converter 44, α-β to d-q (negative sequence) converter 46, integrator block 48, and d-q to abc negative sequence converter 50. Negative sequence feedback circuit 26 is described with respect to functional operations performed. In one embodiment, negative sequence feedback circuit 26 is implemented with a digital signal processor (DSP) programmed to perform the desired operations. In other embodiments, negative sequence feedback circuit 26 may be implemented with analog or programmable circuits designed to perform the desired operations.

In the embodiment shown in FIG. 2, monitored (three-phase) ac voltage provided by voltage sense circuit 23 is provided to ADC 40 for conversion from an analog signal to a digital signal with respect to each monitored phase. A digital output of the monitored ac voltage is provided to high-pass filter 42 to eliminate any dc offsets in the circuitry of ADC 40 (as well as to remove low-frequency components not associated with the high-frequency carrier signal provided to the motor). The filtered ac voltage is provided to a-b to α-β converter 44 and α-β to d-q converter 46 for conversion from the stationary reference frame to the negative sequence (d-q) reference frame. In this way, the monitored three-phase ac voltage is converted from a three-phase stationary reference frame to a two-phase (d-q) reference frame that rotates with the frequency of ac carrier voltage. The negative sequence reference frame provides a convenient framework for analyzing unbalances between the monitored phases. In particular, unbalances in the monitored ac voltage will appear in the d-q reference frame as dc values. The monitored ac carrier voltage is referred to in the negative sequence reference frame as having negative sequence components, with each negative sequence component corresponding to either the d-axis or the q-axis of the negative sequence reference frame.

To negate detected unbalances in the monitored ac carrier voltage as represented by a dc bias on the negative sequence components, the resulting negative sequence components are integrated in the time domain by a pair of integrators (one associated with the d-axis negative sequence component and one associated with the q-axis negative sequence component). The integrated outputs provided by integrator block 48 are converted back to the stationary abc reference frame by d-q to abc converter 50, and the resulting abc output is provided as negative sequence feedback to summer 30 (as shown in FIG. 1) for combination with the high-frequency carrier voltage command signals.

The resulting command signals provided to inverter modulator 36 (as shown in FIG. 1), each a combination of high-frequency command signals and negative sequence feedback, cause inverter 18 (also shown in FIG. 1) to generate a high-frequency ac voltage that overcomes dead-time associated with inverter 18 and variations associated with EMI filter 20 to create a balanced high-frequency ac voltage for supply to motor/load 22. The rate at which the compensation of the negative sequence carrier voltages takes place depends, in part, on the gain associated with each of the integrators associated with integrator block 48. Although the present invention has been described with reference to preferred embodiments, workers skilled in the art will recognize that changes may be made in form and detail without departing from the spirit and scope of the invention.

The invention claimed is:

1. A sensorless motor controller for controlling the operation of a motor/load, the motor controller comprising:
   an inverter having a plurality of transistors selectively controlled to convert a direct current (dc) signal to an alternating current (ac) signal that is provided to a motor/load, the ac signal having a motor drive component and a high-frequency carrier signal component;
   a first sense circuit connected to monitor response of the motor/load to the high-frequency carrier signal provided by the inverter to the motor/load;
   a sensorless circuit connected to calculate a rotor position estimate associated with the motor/load based on the monitored response of the motor/load to the high-frequency carrier signal;

a motor controller connected to calculate the motor drive component of the ac signal provided to the motor/load based, at least in part, on the rotor position estimate provided by the sensorless circuit;

a second sense circuit connected to monitor the high-frequency carrier signal component of the ac signal provided by the inverter to the motor/load; and a negative sequence feedback circuit connected to detect unbalances in the high-frequency carrier signal component monitored by the second sense circuit based on an analysis of negative sequence components of the high-frequency carrier signal component, wherein the negative sequence feedback circuit generates a closed-loop feedback signal that is combined with a high-frequency command signal, the combination being provided to the inverter to generate a balanced high-frequency carrier signal to be provided to the motor/load as the high-frequency carrier signal component.

2. The sensorless motor controller of claim 1, wherein the negative sequence feedback circuit detects unbalances in the high-frequency carrier signal component by converting the high-frequency carrier signal component from a three-phase stationary reference frame to negative sequence components in a two-phase d-q reference frame in which unbalances in the high-frequency carrier signal component appear as a dc bias on the negative sequence components.

3. The sensorless motor controller of claim 2, wherein the negative sequence feedback circuit generates the closed-loop feedback signals by applying a mathematical integration function to the negative sequence components and converting the integrated negative sequence components from the two-phase d-q reference frame to the three-phase stationary reference frame for combination with the high-frequency command signal.

4. The sensorless motor controller of claim 1, wherein the first sense circuit is a current sense circuit and the second sense circuit is a voltage sense circuit, wherein the negative sequence feedback circuit monitors a high-frequency carrier voltage provided to the motor/load and the sensorless circuit calculates the rotor position estimate associated with the motor/load based on the monitored current response of the motor/load to the high-frequency carrier voltage.

5. The sensorless motor controller of claim 1, wherein the first sense circuit is a voltage sense circuit and the second sense circuit is a current sense circuit, wherein the negative sequence feedback circuit monitors a high-frequency carrier current provided to the motor/load and the sensorless circuit calculates the rotor position estimate associated with the motor/load based on the monitored voltage response of the motor/load to the high-frequency carrier current.

6. A method for maintaining a balanced high-frequency carrier signal at the input of a motor for sensorless estimation of rotor position, the method comprising:

monitoring a high-frequency carrier signal provided by an inverter to a motor/load;

converting the monitored high-frequency carrier signal to negative sequence components, wherein converting the monitored high-frequency carrier signal to the negative sequence components includes converting the monitored high-frequency carrier signal from a stationary abc reference frame to a d-q reference frame;

generating negative sequence feedback based on the negative sequence components; and modifying the high-frequency carrier signal based on the negative sequence feedback to minimize unbalance in the high-frequency carrier signal provided by the inverter to the motor/load.

7. The method of claim 6, wherein generating the negative sequence feedback includes integrating each of the negative sequence components in the d-q reference frame to generate counteracting negative sequence components.

8. The method of claim 7, wherein generating the negative sequence feedback further includes converting the counteracting negative sequence components from the d-q reference frame to the stationary abc reference frame.

9. The method of claim 8, wherein modifying the high-frequency carrier signal includes summing the negative sequence feedback with high-frequency command signals, wherein the summed combination of the high-frequency command signal and the negative sequence feedback is used to control the operation of an inverter to minimize unbalances in the high-frequency carrier signal supplied to the motor.

10. A negative sequence feedback controller for use in sensorless detection of rotor position in dynamoelectric machines, the negative sequence feedback controller comprising:

means for monitoring a high-frequency carrier signal provided by an inverter to a motor/load;

means for converting the monitored high-frequency carrier signal to negative sequence components, wherein the means for converting the monitored high-frequency carrier signal to negative sequence components includes converting the high-frequency carrier signal from a three-phase abc reference frame to a two-phase d-q reference frame in which unbalances on the monitored high-frequency carrier signal are represented by a dc bias on the negative sequence components;

means for generating negative sequence feedback based on the negative sequence components; and means for modifying the high-frequency carrier signal based on the negative sequence feedback to minimize unbalances in the high-frequency carrier signal provided by the inverter to the motor/load.

11. The negative sequence feedback controller of claim 10, wherein the means for monitoring the high-frequency carrier signal is a voltage sense circuit connected to monitor a high-frequency carrier voltage provided to an input of a motor/load.

12. The negative sequence feedback controller of claim 10, wherein the means for monitoring the high-frequency carrier signal is a current sense circuit connected to monitor a high-frequency carrier current provided to an input of a motor/load.

13. The negative sequence feedback controller of claim 10, wherein the means for generating negative sequence feedback based on the negative sequence components includes mathematically integrating the negative sequence component associated with the d-axis and the negative sequence component associated with the q-axis and converting the integrated components from the two-phase d-q reference frame to the three-phase abc reference frame.

* * * * *